Figure 2:
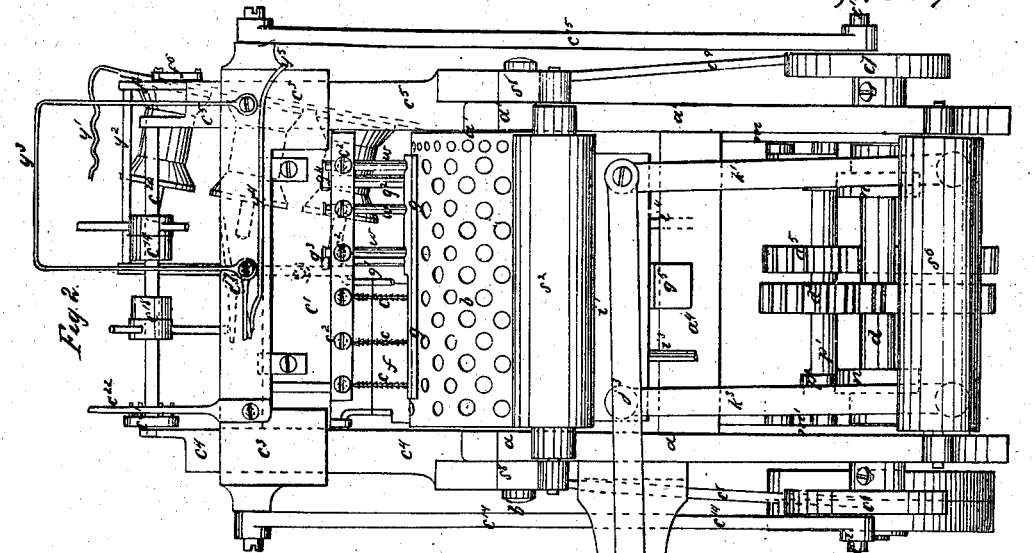

R. Eickemeyer. Sheet 1, 2 Sheets.
Felting Mach.
Nº 87,764. Patented Mar. 16, 1869.

Witnesses
Inventor
R. Eickemeyer

R. Eickemeyer.
Felting Mach.
N° 87,764. Patented Mar. 16, 1869.
Sheet 2, 2 Sheets
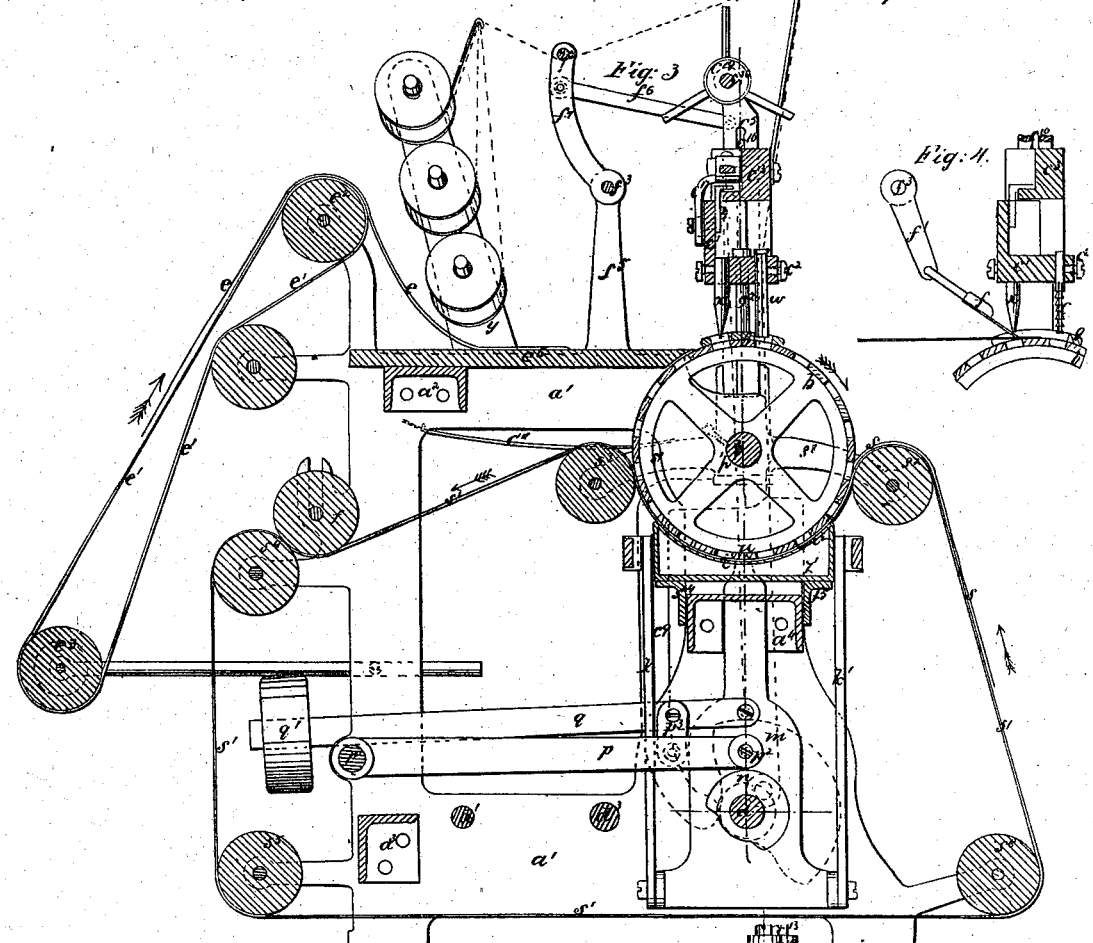
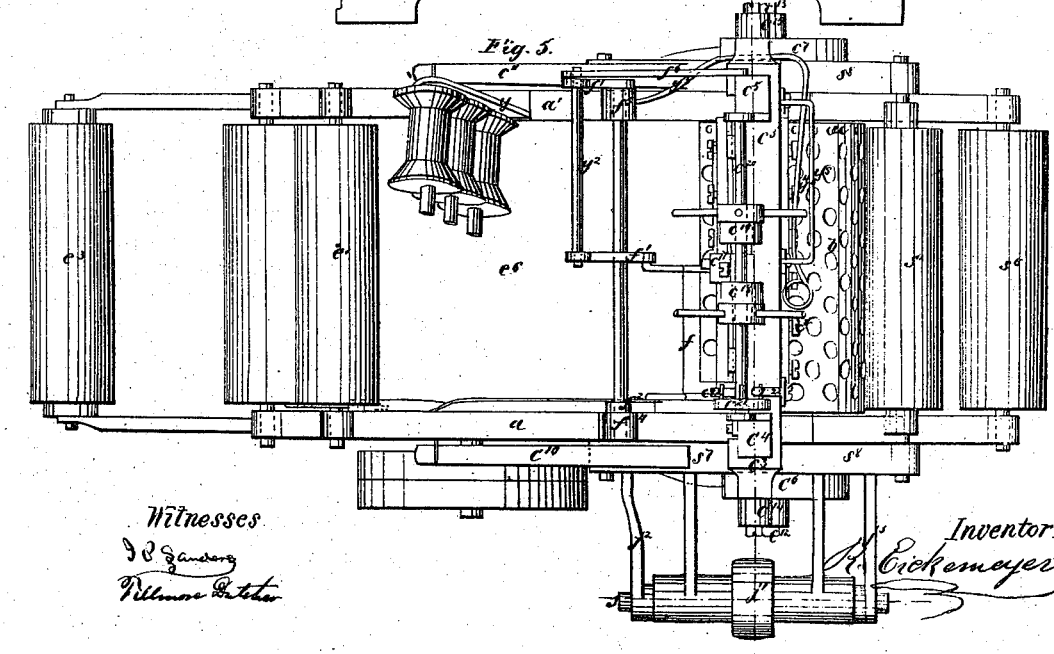
Witnesses
Inventor
R. Eickemeyer

UNITED STATES PATENT OFFICE.

RUDOLF EICKEMEYER, OF YONKERS, NEW YORK, ASSIGNOR TO JOHN T. WARING, OF SAME PLACE.

MACHINE FOR PREPARING AND FELTING TUFTED FABRICS.

Specification forming part of Letters Patent No. 87,764, dated March 16, 1869.

*To all whom it may concern:*

Be it known that I, RUDOLF EICKEMEYER, of Yonkers, in the county of Westchester and State of New York, have invented certain new and useful Improvements in Machinery for Preparing and Felting Tufted Fabrics; and I do hereby declare that the following is a full and correct description thereof, reference being had to the accompanying drawings, and to the letters of reference thereon.

My invention relates to machinery invented, so far as I know, by John T. Waring, of Yonkers, for the preparation and felting of felted tufted fabrics, wherein tufts are secured to a body of previously-manufactured cloth by the process of felting. In said Waring's machine there is a tuft-holder, to hold and protect the tufts, combined with the jiggering apparatus and steam-table of a common hardening or felting-machine such as is used by hatters, and the fabric is prepared by the use of tufting-punches or tufting-needles, as the case may be, manipulated by hand, the tuft-holder, with the prepared fabric, being pushed forward, step by step, by hand to the jigger-board.

The object of my invention is to provide a machine which will carry on the manufacture of said tufted fabrics automatically, and I have succeeded in producing the improved machine herein described, which requires only to be supplied with material for the tufts, whether bats, yarns, or rovings, and material for the body of the fabric, whether of bats or cloth, and to be set in motion to prepare and felt a continuous tufted fabric of any length required.

My said improvements consist, first, in making the tuft-holder of cylindrical form, and combining with it a concave jiggering apparatus; second, in combining with the cylindrical tuft-holder and concave jiggering apparatus an endless apron of linen, canvas, or other suitable material, for a hardening-cloth in the operation of felting, the endless apron being conducted between the cylindrical tuft-holder and concave jiggering apparatus to serve as a hardening-cloth, and also to feed the bat which is to constitute the back or body of the felted tufted fabric; third, in combining with the concave jiggering apparatus a rotating cam and intermediate series of weighted levers, or their equivalents, whereby the concave jiggering apparatus is at proper intervals moved toward and held against the tuft-holder by a regulated yielding pressure, for the purpose of progressively felting the fabric; fourth, in combining with a cylindrical tuft-holder, which has an intermittent motion upon its axis, a reciprocating gang of tufting-punches, to push filaments to form tufts from a bat into the tuft-holes in the tuft-holder; fifth, in combining with an intermittently-moving cylindrical tuft-holder and a gang of reciprocating tufting-punches a presser-plate, to hold the tufts, which have been placed in a row of tuft-holes, while the tufts are being pushed into the next succeeding row; sixth, in combining with the cylindrical tuft-holder, the gang of tufting-punches, and the presser-plate above mentioned a plaiter and feed-table, the plaiter moving back and forth over the feed-table, to push the bat from which the tufts are formed over the feed-table to the tuft-holes in properly-regulated quantities to form tufts; seventh, in combining with the cylindrical tuft-holder, gang of tufting-punches, the presser-plate, and the plaiter above mentioned a feed-apron, which delivers the bat for the tufts upon the feed-table in properly-regulated quantities, as required by the machine; eighth, in combining with the intermittently-moving cylindrical tuft-holder a gang of reciprocating tufting-needles and a presser-plate, with or without an additional gang of perforating instruments, to prepare the fabric and tufts of yarns or rovings; ninth, in combining with the cylindrical tuft-holder, presser-plate, and gang of tufting-needles, above mentioned, a creel of spools for the yarns or rovings, to supply the tufting-needles, together with suitable guides and a clamping mechanism to hold the yarns or rovings while being drawn forward from the spools to the tufting-needles; tenth, in combining the gang of tufting-punches or tufting-needles with the tuft-holder by means of a plate which has a lateral motion alternately in opposite directions, communicated to it by the machine, for the purpose of bringing the gang of tufting-punches or tufting-needles over the tuft-holes of each row when arranged diagonally upon the tuft-holder; eleventh, in combining with the vibrating rubbing-plate of the jiggering apparatus of a felting-machine a steam-box, provided with suitable induction and eduction pipes, the vibrating rubbing-plate being perforated with fine holes, substantially as herein described, the construction being such that steam is supplied to the fabric to be felted from the vibrating jiggering apparatus; but more particularly to describe my invention, I will refer to the accompanying drawings.

In these drawings one half of the machine is shown as arranged to use tufting-punches to make the tufted fabric with tufts from bats, and the other half of the machine is arranged to use tufting-needles to make the tufted fabric with tufts from yarns or rovings. If any one should desire to make the fabric with a machine constructed in this manner there would be no difficulty in doing so; but my intention is to use the machine either with tufting-punches or tufting-needles, and not with both at once. They are represented together in the machine in the drawings to save time and space in the drawings and description.

In the drawings the tuft-holes, tufting-punches, and tufting-needles are exaggerated in size, in order to represent them with clearness.

Figure 1:
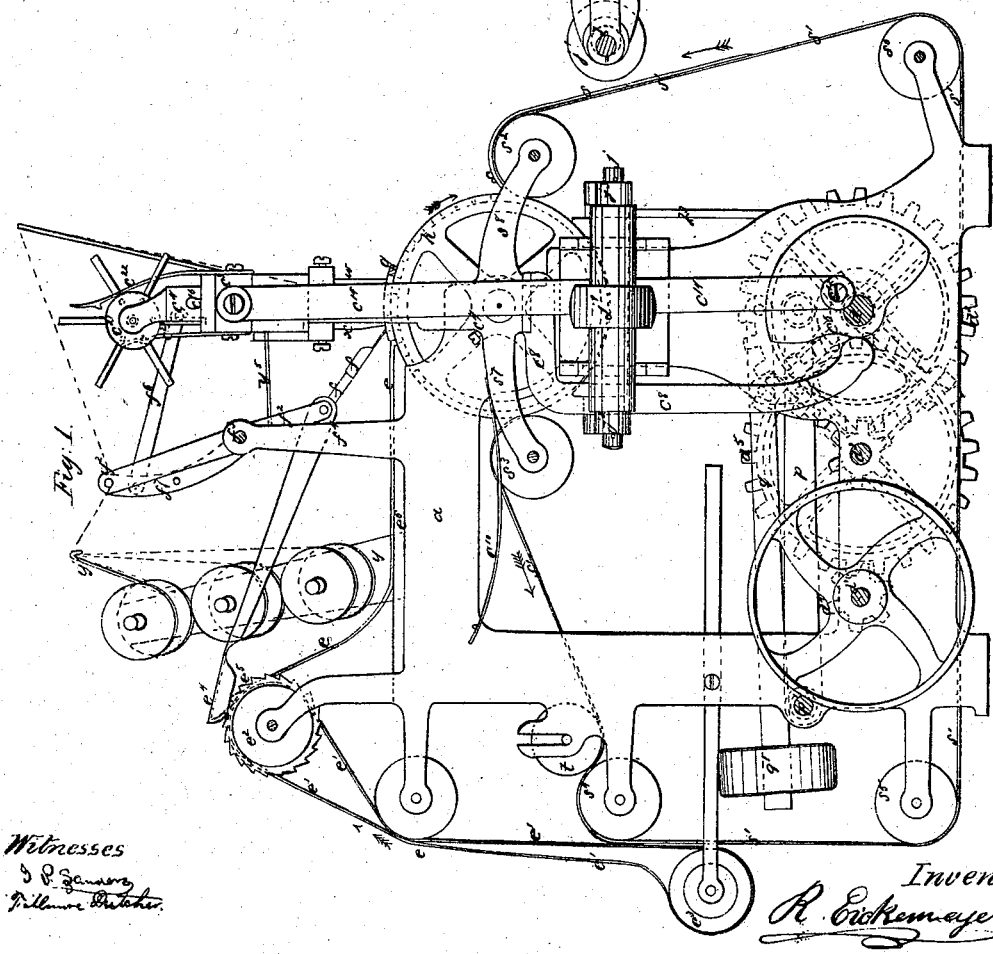

Figure 1 of the drawings represents a side elevation of the machine; Fig. 2, an end view; Fig. 3, a vertical longitudinal section; Fig. 4, a detached sectional view, showing a portion of the tuft-holder, presser-plate, tufting-punch, and plaiter; and Fig. 5, a plan view of the machine.

The main frame of the machine, which should be made of cast-iron, is composed of two side frames, $a$ $a^1$, framed together by the cross-braces $a^2$ $a^3$ $a^4$. The tuft-holder in this machine is a horizontal hollow cylinder, $b$, which should preferably be made of some metal not liable to rust, or galvanized iron, but may be made of cast-iron. It is supported by and turns on the horizontal shaft $b^1$, and is perforated with tuft-holes, of suitable size, number and order of arrangement for the tufts of the desired fabric.

Directly over the cylindrical tuft-holder and in the vertical plane of its axis is a gang of bearded punches, $c$, corresponding in number and distance apart with the arrangement of the tuft-holes in rows across the tuft-holder; and, the rows of tuft-holes in a tuft-holder all being alike as respects number, size, and distance apart, the gang of tuft-punches serves for all the rows of tuft-holes successively; but, although the tuft-holes are arranged in rows across the cylinder, the arrangement is generally such that the holes of one row are opposite the blanks of the next preceding and succeeding rows, to make a diagonal pattern, and therefore the gang of punches must have an up-and-down motion to punch the bat for the tufts into the tuft-holes, and a side motion across the machine, alternately in opposite directions, to correspond with the position of the rows of the tuft-holes. The tuft-punches have also another motion as this machine is arranged—i. e., they move with the cylinder, or, more properly speaking, they move the tuft-holder on its axis step by step, one row at a time, while within the tuft-holes, then withdraw from the tuft-holes, and move back over the next row of tuft-holes to be filled. The tuft-punches being in the tuft-holes at a time when it is convenient for the other operations of the machine to move the tuft-holder a row, they would have to move with it, and are therefore made use of to move it. A strong pin might be placed at the end of the gang of punches, in line with it, and work in an outside series of holes in the tuft-holder, made especially for it, and thus take the strain off the gang of punches; but it is not necessary in practice. The motion of the tuft-punches for punching or pushing the bat into the tuft-holes for moving the cylinder forward row by row, and for their lateral adjustment over the rows of tuft-holes, is obtained as follows:

The tuft-punches are set in sockets in a plate, $c^1$, which may be called a "punch-holder," the punches being secured in the sockets by pinching-screws $c^2$. The punch-holder plate $c^1$ is placed in a cross-head, $c^3$, that extends across the machine, and is fitted to and slides up and down on two upright rocking arms, $c^4$ $c^5$, one on each side of the machine. These upright rocking arms $c^4$ $c^5$ are pivoted on the outer ends of the shaft $b^1$, upon which the tuft-holder turns, so that they rock on the axis of the tuft-holder, and they are held at rest and rocked forward and backward to move the tuft-holder by the two cams $c^6$ $c^7$, one at each side of the machine, fast to the rotating cam-shaft $d$, through the bent arms $c^8$ $c^9$, respectively attached to the upright rocking arms. The bent arms $c^8$ $c^9$ are held to the surface of the cams $c^6$ $c^7$ by the springs $c^{10}$ $c^{11}$.

The cam-shaft is driven from the pulley-shaft $d^1$ by intermediate gear-wheels, as follows: A spur-wheel, $d^2$, fast to the cam-shaft $d$, is driven by a pinion fast to the shaft $d^3$, the shaft $d^3$ being driven by a pinion, $d^4$, fast to the pulley-shaft $d^1$, gearing into a spur-wheel, $d^5$, fast to the shaft $d^3$. The object of this train of wheels being merely to reduce the speed of the crank-shaft, and thereby augment the power applied to the driving-pulley $d^6$, the exact proportions of the gear-wheels are immaterial, and will, of course, depend upon the width of the machine and the fabric to be made therein.

The cross-head $c^3$ is moved up and down on the upright rocking arms $c^4$ $c^5$ by means of the two crank-pins $c^{12}$ $c^{13}$, one at each side of the machine, fast to the cams $c^6$ $c^7$, through the links $c^{14}$ $c^{15}$, respectively connected with each end of the cross-head.

The lateral movement of the tufting-punch holder $c^1$ to adjust the gang-punches to the position of the rows of tuft-holes is obtained as follows: The plate $c^1$, which constitutes the punch-holder, is held in and by the the cross-head by means of a slot or mortise in each end of the cross-head, (not shown in the drawings,)

which permits the plate to move laterally, but compels it to move up and down with the cross-head, and a vertical slot, $c^{16}$, is cut in each of the rocking arms upon which the cross-head slides, to permit the punch-holding plate to slide up and down with the cross-head.

A T-shaped lever, $c^{17}$, is pivoted at the intersection of its arms upon the cross-head $c^2$, and moves up and down with it, being connected with the punch-holding plate $c^1$ by a slot in its vertical arm and a pin fixed in the plate, so that an alternate downward movement of the horizontal arms will cause an alternate lateral movement of the punch-holding plate. The alternate downward movement of the horizontal arms of the T-shaped lever is caused by the pins or spokes projecting from the hubs $c^{18}$ $c^{19}$, fast to the intermittently-rotating horizontal shaft $c^{20}$, which is placed directly over the T-shaped lever, and rotates in bearings in the upper end of the upright rocking-levers, upon which the cross-head slides.

A pin-wheel, $c^{21}$, fast to the horizontal shaft $c^{20}$, containing six pins, is moved, one pin at a time, at each downward movement of the cross-head and punch-holding plate, by means of a catch or pawl, $c^{22}$, attached to the cross-head, which causes one of the spokes or pins in the hubs $c^{18} c^{19}$ to be brought perpendicularly over one of the arms of the T-lever, one hub being placed over each arm of the lever, and each hub having but half as many spokes or pins projecting from it as there are pins in the pin-wheel, and arranged alternately.

The pin-wheel shaft is held stationary by a spring, $c^{23}$, bearing upon the pins of the pin-wheel, the spring yielding to permit the shaft to be turned by the pawl.

The effect of the operation of the pin-wheel shaft and its spokes is, that the pin-wheel being set to correspond with the alternation of the rows of tuft-holes, a spoke in the hubs of the pin-wheel shaft is brought over that arm of the T-shaped lever which must be moved downward to give the punch-holder plate its proper lateral movement to bring the punches over the tuft-holes they are next to enter; and when the punch-holding plate rises with the cross-head sufficiently to clear the punches from the tuft-holder and the filaments of the tufts thereon, the proper arm of the T-lever comes in contact with a spoke of the hub directly over it upon the pin-wheel shaft, and is pushed down by it, causing the punch-holding plate to move laterally in the proper direction to adjust it to the tuft-holes of the next row.

The bat or sliver $e$, from which the tufts are formed, is received from a carding-engine upon an inclined endless band, $e^1$, which is extended over two drums, $e^2$ $e^3$, and moved intermittently by a pawl, $e^4$, and a ratchet-wheel, $e^5$, connected with the upper drum, so as to deliver the sliver or bat upon the horizontal table $e^6$, which is placed in front of and about level with the upper surface of the tuft-holder.

The bat is pushed forward intermittently over the table to the tuft-holder by the plaiter $f$ at the end of each forward movement of the tuft-holder, while the tufting-punches are moving back to take their position for a new row of tufts.

The plaiter $f$ is a light flat board, or thin plate of metal, armed with short sharp teeth at its lower edge, to take hold of the bat, and is suspended in an inclined position from two arms, $f^1$ $f^2$, attached to a rock-shaft, $f^3$, which rocks in bearings in the vertical standards $f^4$ $f^5$, placed at each side of the table $e^6$. The rock-shaft $f^3$ derives its motion from the upright rocking arm $c^5$ by means of a link, $f^6$, which connects the rocking arm $c^5$ with an arm, $f^7$, attached to the rock-shaft $f^3$. The pawl $e^4$, that feeds the bat and delivers it on the table, is jointed to the arm $f^2$ of the rock-shaft $f^3$, and moved by it.

A presser-plate, $g$, rests on the upper surface of the tuft-holder, covering one or more rows of tuft-holes, and is connected with the punch-holding plate $c^3$ by means of two perpendicular guide-rods, $g^1$ $g^2$, attached to the presser-plate, which extend upward through guide-holes in the punch-holding-plate.

Collars $g^3$ $g^4$ are placed upon the upper end of the guide-rod, so as to engage with the cross-head, for the purpose of slightly lifting the presser-plate after the tufting-punches are withdrawn from the tuft-holes, to enable it to be moved freely over the bat to the next row of tuft-holes.

The position of the presser-plate is so adjusted with respect to the tuft-holder that when the punches are brought over the row of tuft-holes to be filled the presser-plate covers the row that has just been filled.

When the presser-plate moves back with the cross-head, after the punches are withdrawn from the tuft-holes just filled, the plaiter moves forward toward the tuft-holder and pushes a sufficient quantity of filaments of the bat $e$ forward to form the next row of tufts, and holds them against the side of the presser-plate, in the form of a partial plait or fold, directly over the tuft-holes to be filled, and at the same time the pawl $e^4$ acts upon the ratchet of the feed-apron $e^5$, and delivers upon the table the required quantity of the bat for the next succeeding row of tufts. The tuft-punches $c$ then descend, pushing portions of the fold of the bat into the tuft-holes sufficient for the tufts, and then, while in the tuft-holes, move forward the distance of one row of tuft-holes, carrying the tuft-holder the same distance with them. The tuft-holder is then locked in the position to which it has thus been moved by a locking mechanism hereinafter described, and the punches withdrawn from the tuft-holes by an upward movement of the cross-head, and then moved back to their first position. The presser-plate holds the tufts in the tuft-holes, and prevents the filaments connecting them from being displaced by the operation of filling the succeeding rows.

The jigger or rubbing plate, by which the felting is accomplished in this machine, is a concave metal plate, $i$, which forms the top plate of a steam-box, $i^1$. The concave plate is perforated with fine holes $i^2$ to permit the steam to pass to the fabric, and is applied to the under side of the tuft-holder when in action for felting, which is during the time from the commencement of the withdrawal of the tuft-punches to the time when the tuft-holder commences to move again after the succeeding row of tufts is put in the tuft-holes.

The steam-box $i^1$ has suitable induction and eduction pipes $i^3$ $i^4$, (shown broken off,) which should be respectively connected by flexible connection with a source of supply of steam and a waste-water receptacle. This steam-box or jigger receives a very short and exceedingly rapid motion from the eccentric-shaft $j$, which may be driven by a rapid belt, as usual, from a separate counter-shaft overhead, running upon the driving-pulley $j^1$, and is connected to the steam-box by two connecting-rods, $j^2$ and $j^3$.

At each side of the jigger-box are guides $j^4$ $j^5$, which do not interfere with its being moved toward and from the tuft-holder.

The jiggering steam-box is held to the surface of the material on the tuft-holder, when in action, by a yielding pressure, and withdrawn from it, when the tuft-holder is to be moved, to permit it to be moved, by mechanism, as follows: The steam jigger-box is supported by four rocking columns, $k$ $k^1$ $k^2$ $k^3$, two of which, $k$ $k^1$, are connected by joints to lugs or projections from the lower part of the sliding-frame plate $m$, which slides up and down upon slides inside the main frame, and the other two columns, $k^2$ $k^3$, are similarly connected to an opposite sliding plate, $m'$. The two sliding plates $m$ and $m'$ are exactly alike, facing each other on opposite sides of the machine, within the side frames, and are each independently moved upward by means of the cams $n$ $n'$, operating through the two systems of weighted levers, one system for each sliding plate.

The systems of weighted levers are both the same, and therefore a description of only one system will be given—that which is in connection with the cam $n$ and the sliding plate $m$. This system of levers consists of a lever, $p$, pivoted upon the cross-shaft $p^1$, and extending horizontally to the cam $n$, being provided at the end with an anti-friction roller, $p^2$, which runs on the cam. The lever $p$ is linked by a short link, $p^3$, to the fulcrum-point of a lever, $q$, immediately above it, which lever is connected to the sliding plate $m$ at one end, and is loaded with weights $q'$ at the other end.

The arrangement and proportions of the levers being as shown in Fig. 3 of the drawings, the cam lifts the sliding plate and its end of the steam-box by lifting the weighted lever $q$. When the cam turns to lower the sliding plate the weighted lever $q$ rests on the cross-shaft $p^1$, close by the weights, and relieves the sliding plate and steam-box from the upward pressure due to the weights, permitting the steam-box to be lowered sufficiently to allow the tuft-holder to be moved.

The bat $s$, which forms the back of the fabric, may be received from a carding-engine (or a preparing-machine if cross-bats are used) upon an inclined portion of an endless apron or feeding-band, $s^1$, which is extended over drums $s^2$ $s^3$ $s^4$ $s^5$ $s^6$, passing between the concave jiggering-surface of the steam-box and the tuft-holder, from the rear to the front of the machine, thence downward and underneath the machine to the rear. This feeding-band is also a hardening-cloth, and should be made of linen, canvas, or other suitable material for a hardening-cloth. It derives its feeding-motion from two of the drums, $s^2$ $s^3$, which are hung on hangers $s^7$ $s^8$, projecting laterally from the upright rocking arms $c^4$ $c^5$.

When the rocking arms move forward to move the tuft-holder the drums $s^2$ $s^3$ are also moved on the axis of the tuft-holder, which causes the feeding-band $s^1$ to move with the tuft-holder; and when the tuft-holder is locked in position, and the feeding-band is grasped between the jigger-box and tuft-holder, the drums $s^2$ $s^3$ are moved back under the band by the upright rocking arms.

The fabric, as it comes from the tuft-holder after felting, may be received and rolled upon the cylinder $t$, by the friction of the feeding-apron $s^1$.

The tuft-holder is locked in place at the end of each forward movement, and remains locked until the jigger-box has ceased to rub upon the fabric, and is removed from contact with the hardening-cloth by means of a catch, $u$, upon the top of the sliding frame $m$, which locks with the tuft-holder by the tooth of the catch engaging, successively, with a series of holes, $u'$, around the periphery of the tuft-holder, corresponding in number with the rows of tuft-holes.

Thus far the above description applies to the machine as constructed to operate with tufting-punches for making tufted fabrics with tufts from a bat.

When the tufts are to be made from yarns or rovings, the gang of tufting-punches is removed from the punch-holding plate $c^1$, and replaced by a gang of tufting-needles, $w$.

If the tufts are to be introduced into cloth, the plaiter is removed, and a gang of sharp-pointed perforating instruments, $x$, also placed in the punch-holding plate, parallel with the tufting-needles, in order to perforate the cloth one row in advance of the tufting-needles.

The tufting-needles $w$ are represented as cylindrical tubes, bell-mouthed at their upper ends, where they receive the yarns or rovings, open at their lower ends, and without points.

If the sharp perforating instruments are not used it will be necessary to have points to the tubular tufting-needles, as shown in Mr. Waring's specifications; but it is better to use the additional gang of sharp perforating instruments; and when they are used, the presser-plate should extend around them, so as to act as a doffer when they are withdrawn from the cloth.

The presser-plate presses on the cloth by its own weight and by the weight of the sliding guide-rods; but a spring may be applied in any convenient way to increase the pressure, if desired.

The yarns which supply the needles are to be placed in spools on a creel, $y$, one spool for each needle, passing from the spools upward over the guide $y^1$; thence forward under the guide-rod $y^2$ and over the guide-rod $y^3$, and downward between the spring clamping-bar $y^4$ and the cross-head to the needles.

The clamping-bar $y^4$ is a spring attached to the face of the cross-head, and has a bent arm or tail, $y^5$, which extends around one end of the cross-head, so as to come in contact with the standard $f^5$ when the cross-head moves back with the needles, and to remain in contact with said standard, relieving the yarns from the pressure of the clamping-spring, while the needles are passing down through the cloth and drawing the yarns into the tuft-holder; but when the cross-head moves forward to move the tuft-holder, the tail of the clamp being moved away from the standard $f^5$, the yarns are clamped to the cross-head, and thereby drawn from the spools, the motion of the guide-rod $y^3$, which is carried by the cross-head, and the guide $y^2$, which is carried by and moves with the arm $f^7$, assisting the operation of drawing the yarn from the spools for the succeeding row of tufts.

I claim as of my invention and improvement in machinery for preparing and felting tufted fabrics—

1. The cylindrical tuft-holder, in combination with the concave jiggering apparatus, substantially as described.

2. The combination of the cylindrical tuft-holder, the concave jiggering apparatus, and the endless feeding-apron or hardening-cloth, substantially as described.

3. The combination of the cylindrical tuft-holder, concave jiggering apparatus, and the rotating cam and intermediate series of weighted levers, or their equivalents, whereby the concave jiggering apparatus is at proper intervals moved toward and held against the tuft-holder by a regulated yielding pressure, substantially as and for the purposes described.

4. The combination of the intermittently-moving cylindrical tuft-holder with a reciprocating gang of tufting-punches, substantially as and for the purposes described.

5. The combination of the intermittently-moving cylindrical tuft-holder with a gang of reciprocating tufting-punches and a presser-plate, substantially as and for the purposes described.

6. The combination of the cylindrical tuft-holder, the gang of tufting-punches, the presser-plate, the plaiter, and feed-table, substantially as and for the purposes described.

7. The combination of the cylindrical tuft-holder, the gang of tufting-punches, the presser-plate, the plaiter, the feed-table, and the feed-apron, which delivers the bat for the tufts upon the feed-table, substantially as and for the purposes described.

8. The combination of the intermittently-moving cylindrical tuft-holder with the gang of reciprocating tufting-needles and a presser-plate, with or without an additional gang of perforating instruments, substantially as and for the purposes described.

9. The combination of the cylindrical tuft-holder, presser-plate, and gang of tufting-needles with the creel of spools, yarn-guides, and clamping mechanism, substantially as and for the purposes described.

10. The combination of the gang of tufting-punches or tufting-needles with the tuft-holder by means of a plate which has a lateral motion alternately in opposite directions communicated to it by the machine, for the purpose of bringing the gang of tufting-punches or tufting-needles over the tuft-holes of each row when arranged diagonally upon the tuft-holder, substantially as described.

11. In combination with the vibrating rubbing-plate of the jiggering apparatus of a felting-machine, a steam-box provided with suitable induction and eduction pipes, the vibrating rubbing-plate being perforated with fine holes, and the construction being such that steam is supplied to the fabric while being felted from the vibrating jiggering apparatus, substantially as described.

R. EICKEMEYER.

Witnesses:
  I. P. SANDERS,
  FILLMORE DUTCHER.